UNITED STATES PATENT OFFICE.

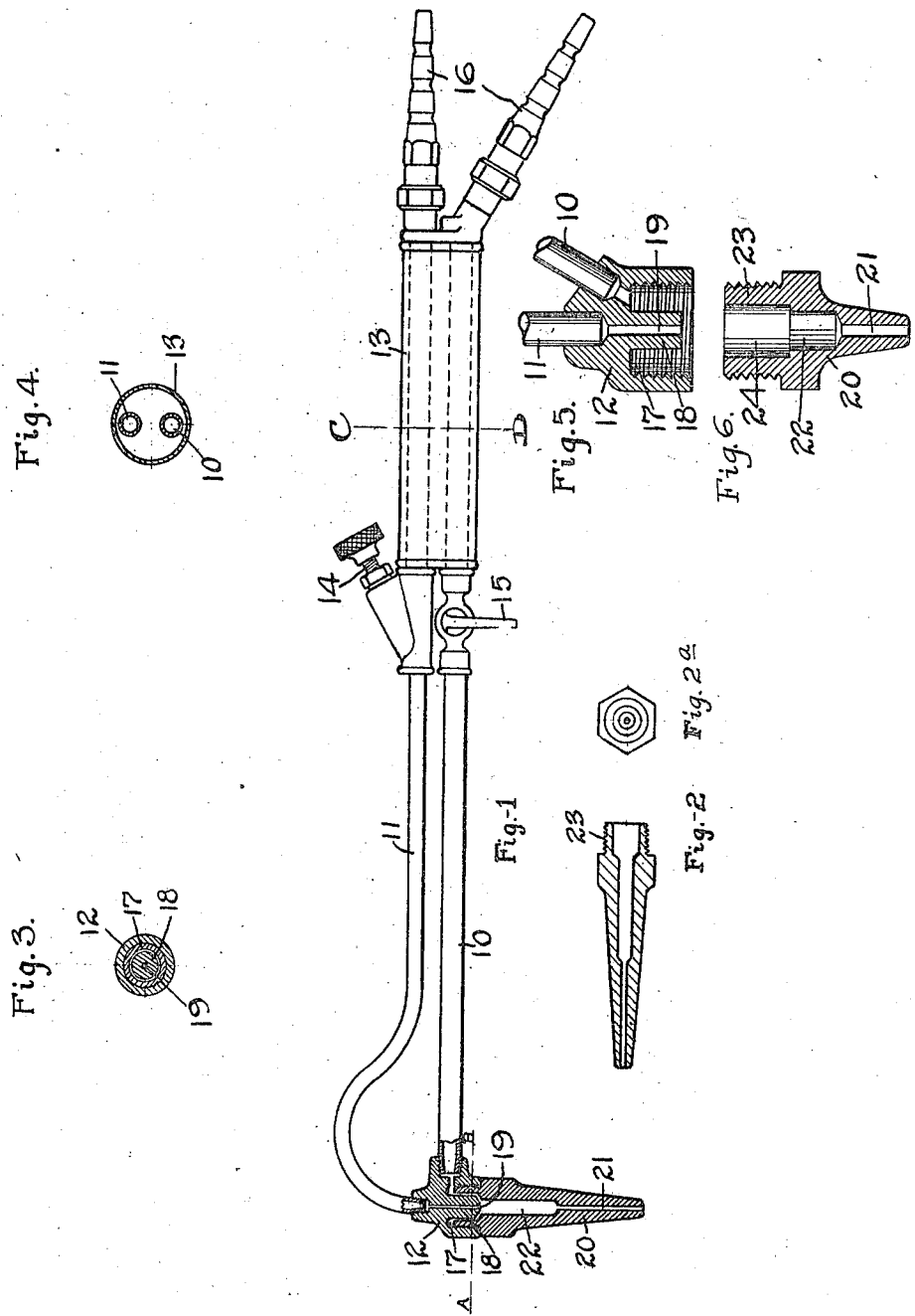

CHARLES HOLDER, JR., OF NEW YORK, N. Y., ASSIGNOR TO HOLDER WELDING EQUIPMENT CO., A CORPORATION OF NEW YORK.

BLOWPIPE.

1,093,420.  Specification of Letters Patent.  Patented Apr. 14, 1914.

Application filed May 24, 1910. Serial No. 563,234.

*To all whom it may concern:*

Be it known that I, CHARLES HOLDER, Jr., a citizen of the United States, residing at New York city, in the county of New York and State of New York, have invented new and useful Improvements in Blowpipes, of which the following is a specification.

This invention relates to blow pipes and its object is to provide a pipe with a head to receive blasts of air and gas or inflammable vapor, the head being adapted to receive a nozzle having an outlet and a proportionately large mixing chamber to receive and mix the gas preparatory to its issuing from the outlet as will be more fully described in the following specification, set forth in the claim and illustrated in the drawings, wherein:

Figure 1 is a side elevation of the blow pipe with part in section. Fig. 2 is a longitudinal sectional view of a modified form of nozzle detached. Fig. 2ª is an end view of the nozzle shown in Fig. 2. Fig. 3 is a transverse sectional view of the blow pipe cut on the line A—B of Fig. 1. Fig. 4 is a similar view cut on the line C—D of Fig. 1. Fig. 5 is a sectional view of a slightly modified form of head which may be used upon the blow pipe. Fig. 6 is a sectional view of still another modified form of nozzle which may be used upon the blow pipe.

This blow pipe consists of pipes 10 and 11, the former conducting gas or inflammable vapor to the head 12 and the pipe 11 being provided to supply the interior of the head with air or oxygen. The two pipes are held together by means of a cylinder 13 which also acts as a hand piece to manipulate the pipe and the pipe 11 is provided with the needle valve 14 while the pipe 10 has a cock 15 to shut off the gas supply. Each pipe has at its end a nipple 16 by which it may be connected with tanks or pumps through the medium of a flexible tube so that the blow pipe may be carried to any desired point or thrown at any convenient angle to operate it.

The head 12 is recessed and tapped to form a chamber 17 through the center of which depends a nozzle 18 through which extends the passage 19 for the flow of the oxygen and is controlled by needle valve 14. The gas after entering the head from the pipe 10, passes down the chamber around the nozzle 18 and meets the air or oxygen from the passage 19 and is mixed in chamber 22.

The nozzle 20 containing the outlet is of any desired size and length and the orifice 21 out of which the mixed gas passes may be of any desired size to provide the necessary flame by increasing or decreasing the length of mixing chamber 22 and the diameter of passage 24 according to whether a large or small nozzle is screwed on. A large nozzle will have a longer mixing chamber and the diameter of passage 24 will be greater so as to pass more gas while a small nozzle will have a smaller mixing chamber and passage 24 will be of smaller diameter. This mixing chamber 22 into which the air and gas pass from the passage 19 and the chamber 17 causes them to combine so that they are ready for burning on issuing from the orifice 21. It will be seen that the nozzle in Fig. 2 is slightly longer than that shown in Fig. 1 while in Fig. 6 a shorter nozzle with smaller orifice 21 and mixing chamber is provided so the latter is only large enough to provide for the amount of gas furnished through the circular part formed by screwing nozzle 20 over nozzle 18 and it is obvious that these nozzles 20 may be changed at pleasure when it is necessary to obtain a larger or smaller flame and this change is effected by providing the upper end of the nozzle with the reduced portion 23 which is screwed into the outer walls of the chamber 17 which is correspondingly threaded.

It is obvious that other modifications and arrangements of the parts may be provided for, without departing from the essential features above described.

What I claim as new and desire to secure by Letters Patent is:

A blow pipe comprising a head having at one side a chamber and a nozzle centrally positioned therein with its discharge end terminating short of a plane in which the edge of the chamber lies, a gas pipe communicating with said chamber at the inner end thereof, an air pipe connected to the head at the receiving end of the nozzle, and a detachable nozzle connected to the head and having an end portion extending into the chamber and terminating short of the communication between the first mentioned pipe and the chamber, the said end portion of the detachable nozzle receiving and being spaced from the discharge end of the first-mentioned nozzle, said nozzles having alined bores, the bore in the detachable nozzle being of three different diameters with the section thereof of smallest diameter located at its discharge end, the next largest section located at the delivery end of the first mentioned nozzle and the section of the bore of largest diameter located in the chamber of the head, the intermediate bore of the detachable nozzle being of greater diameter than the bore of the first mentioned nozzle.

In testimony whereof I affix my signature in presence of two witnesses.

CHARLES HOLDER, Jr.

Witnesses:
JAMES F. DUHAMEL,
GEO. A. SENIOR.